(12) United States Patent
Flach et al.

(10) Patent No.: US 7,583,690 B2
(45) Date of Patent: Sep. 1, 2009

(54) ALLOCATION OF STATION ADDRESSES TO COMMUNICATION USERS IN A BUS SYSTEM

(75) Inventors: Manfred Flach, Amberg (DE); Petra Krogel, Wolmirstedt (DE); Axel Pöschmann, Magdeburg (DE); Albert Tretter, Pirk (DE)

(73) Assignees: Siemens Aktiengesellschaft, Munich (DE); Institut fur Automation and Kommunikation e.V, Barleben (DE)

( * ) Notice: Subject to any disclaimer, the term of this patent is extended or adjusted under 35 U.S.C. 154(b) by 531 days.

(21) Appl. No.: 10/563,502

(22) PCT Filed: Jun. 30, 2004

(86) PCT No.: PCT/EP2004/007120

§ 371 (c)(1),
(2), (4) Date: Jun. 29, 2006

(87) PCT Pub. No.: WO2005/003982

PCT Pub. Date: Jan. 13, 2005

(65) Prior Publication Data

US 2006/0253615 A1 Nov. 9, 2006

(30) Foreign Application Priority Data

Jul. 7, 2003 (DE) ............................... 103 30 596

(51) Int. Cl.
*H04J 3/26* (2006.01)
(52) U.S. Cl. ................... 370/432; 370/389; 709/226
(58) Field of Classification Search ............. 370/389, 370/392, 393, 431, 432, 474, 465, 489, 490, 370/475, 390; 709/211, 226; 710/4, 9
See application file for complete search history.

(56) References Cited

U.S. PATENT DOCUMENTS

| | | | | |
|---|---|---|---|---|
| 4,430,651 A * | 2/1984 | Bryant et al. | .......... | 340/825.52 |
| 4,847,834 A | 7/1989 | Bryant | | |
| 5,793,993 A * | 8/1998 | Broedner et al. | ............ | 710/106 |
| 6,731,625 B1 * | 5/2004 | Eastep et al. | ................. | 370/352 |
| 6,775,273 B1 * | 8/2004 | Kung et al. | ................. | 370/356 |
| 6,850,510 B2 * | 2/2005 | Kubler et al. | ............... | 370/338 |
| 6,957,276 B1 * | 10/2005 | Bahl | .......................... | 709/245 |
| 7,072,963 B2 * | 7/2006 | Anderson et al. | ........... | 709/225 |
| 7,379,451 B1 * | 5/2008 | Brebner | ...................... | 370/356 |

(Continued)

FOREIGN PATENT DOCUMENTS

DE        197 13 240 A1     10/1998

(Continued)

*Primary Examiner*—Chi H. Pham
*Assistant Examiner*—Kevin Mew

(57) ABSTRACT

The invention relates to a method for simplified allocation of station addresses to communication users in a bus system, and communication users in a bus system. A first communication user, which can automatically transmit to the bus, can allocate data to a station address, said data clearly identifying another communication user, or characterizing a station address as non-occupied. An additional communication user who has already sent a data packet with clearly identifying data to the first communication user in an earlier communication cycle by means of said communication user and who receives a data packet comprising data in a later communication cycle, whereby said data does not clearly identify said communication user, can automatically alter the station address thereof in a station address characterized as not being occupied.

17 Claims, 5 Drawing Sheets

U.S. PATENT DOCUMENTS

| | | | |
|---|---|---|---|
| 7,469,297 B1 * | 12/2008 | Kostoff et al. | 709/236 |
| 2003/0069974 A1 * | 4/2003 | Lu et al. | 709/226 |
| 2006/0039279 A1 | 2/2006 | Sturrock et al. | 370/228 |
| 2007/0233872 A1 * | 10/2007 | Yoshikawa et al. | 709/226 |

FOREIGN PATENT DOCUMENTS

| | | |
|---|---|---|
| DE | 299 07 265 U1 | 10/1999 |
| DE | 100 40 438 A1 | 3/2002 |

* cited by examiner

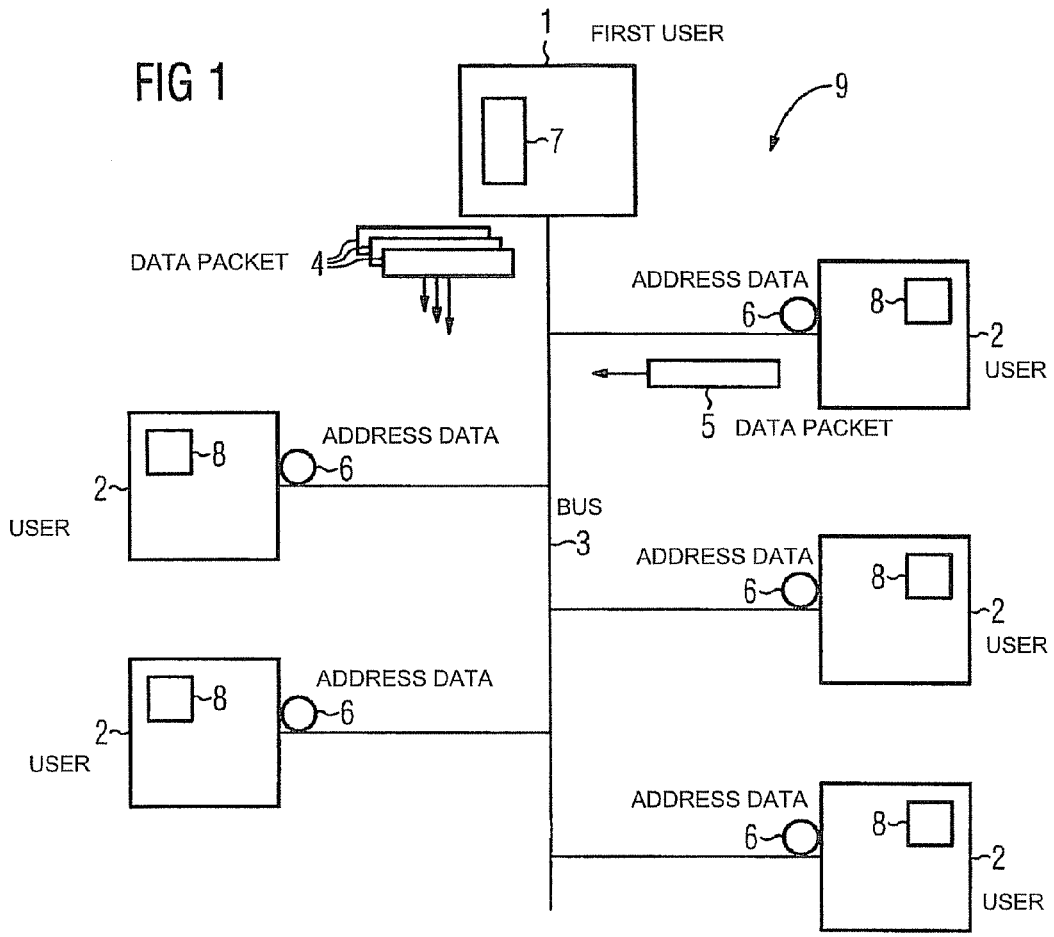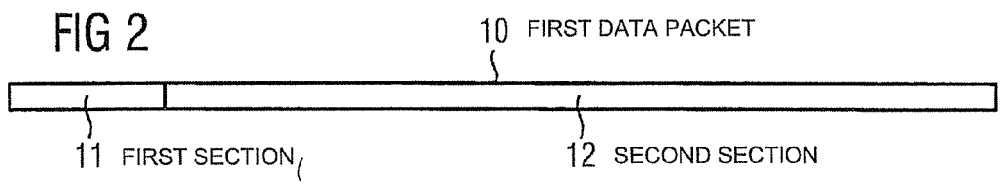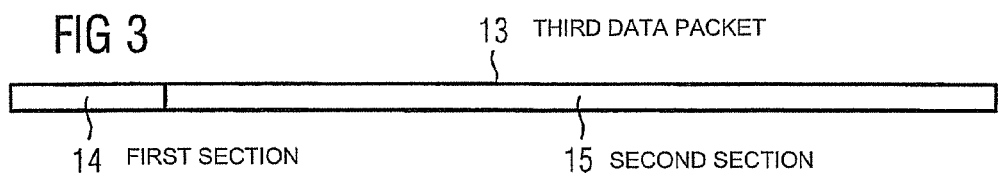

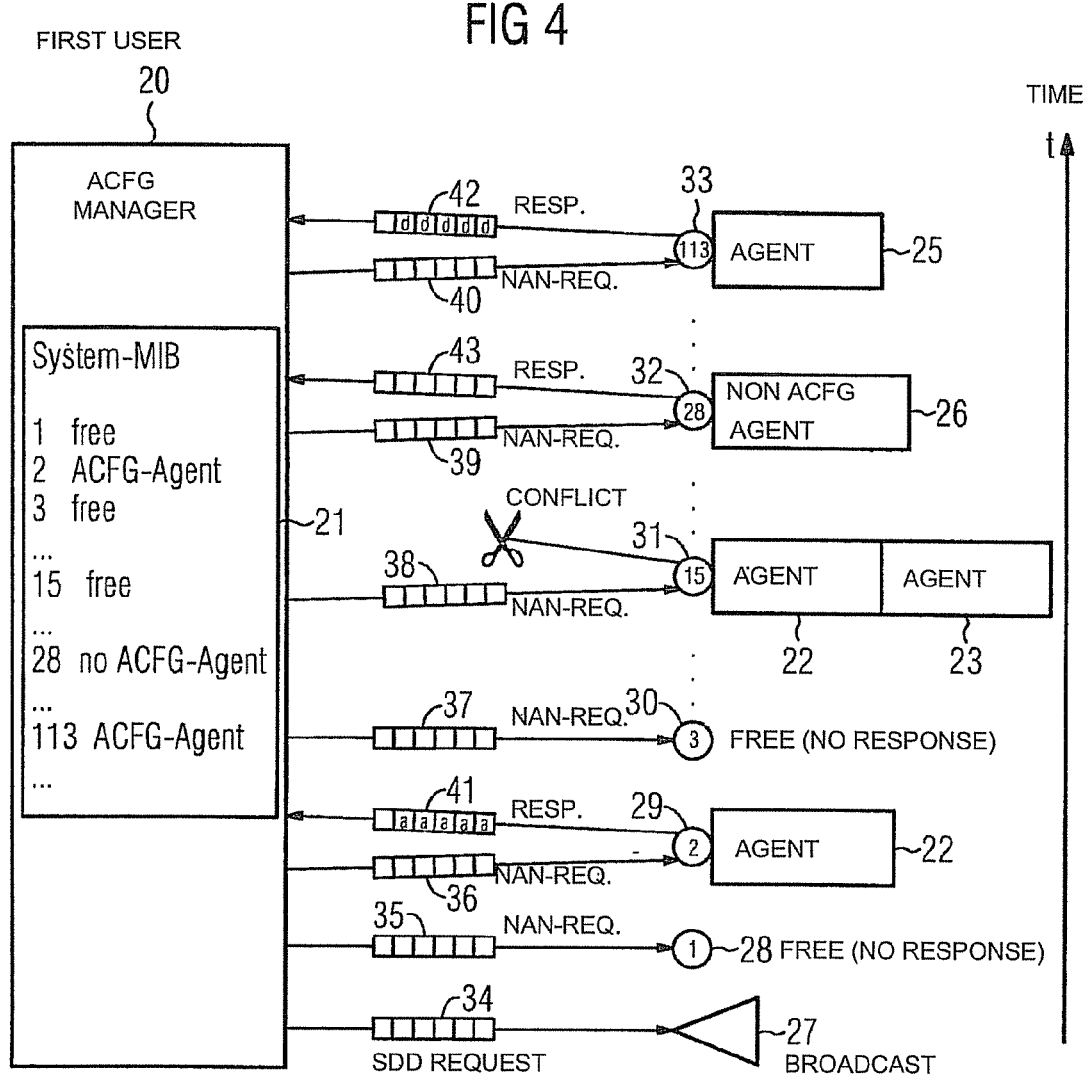

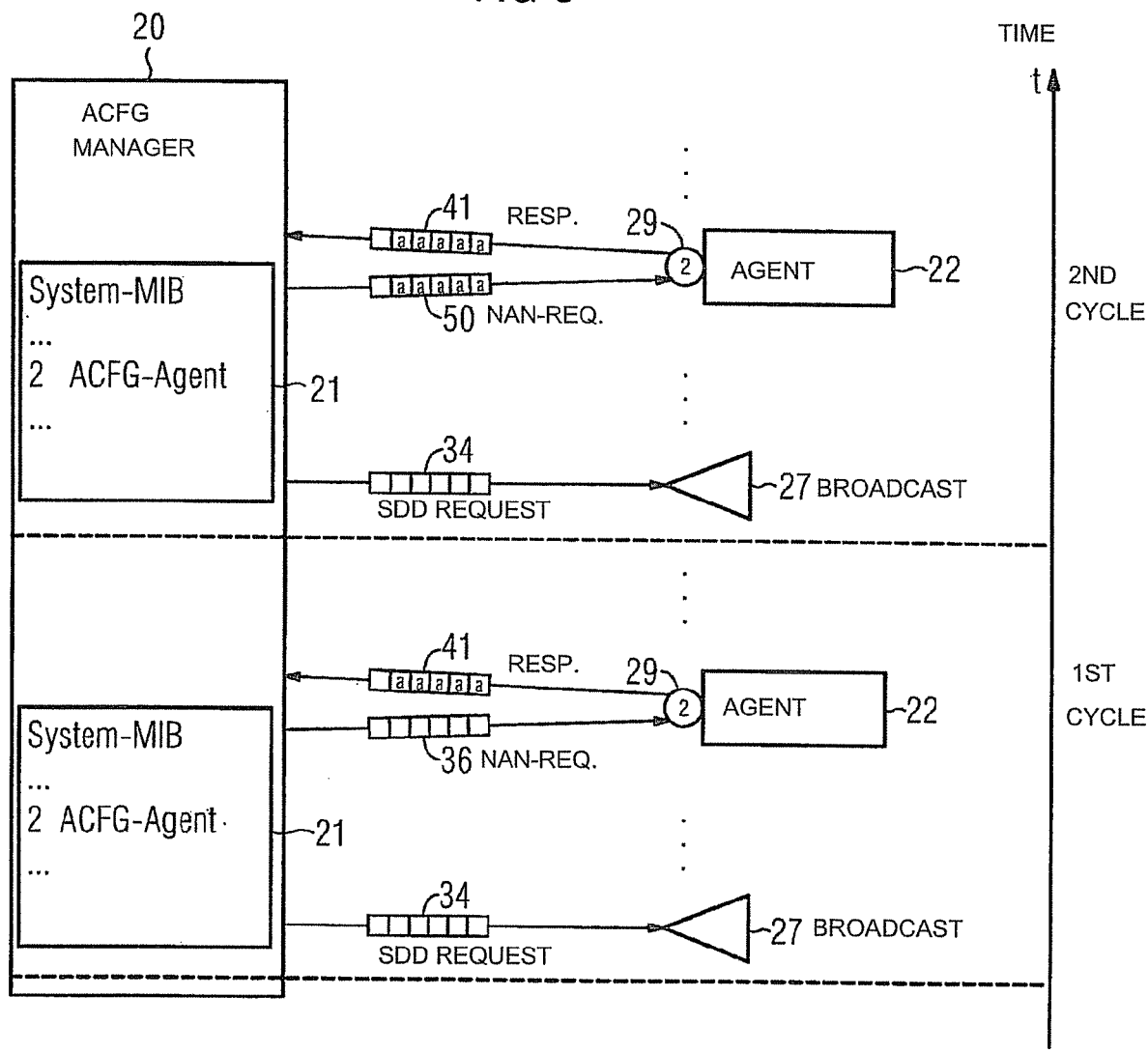

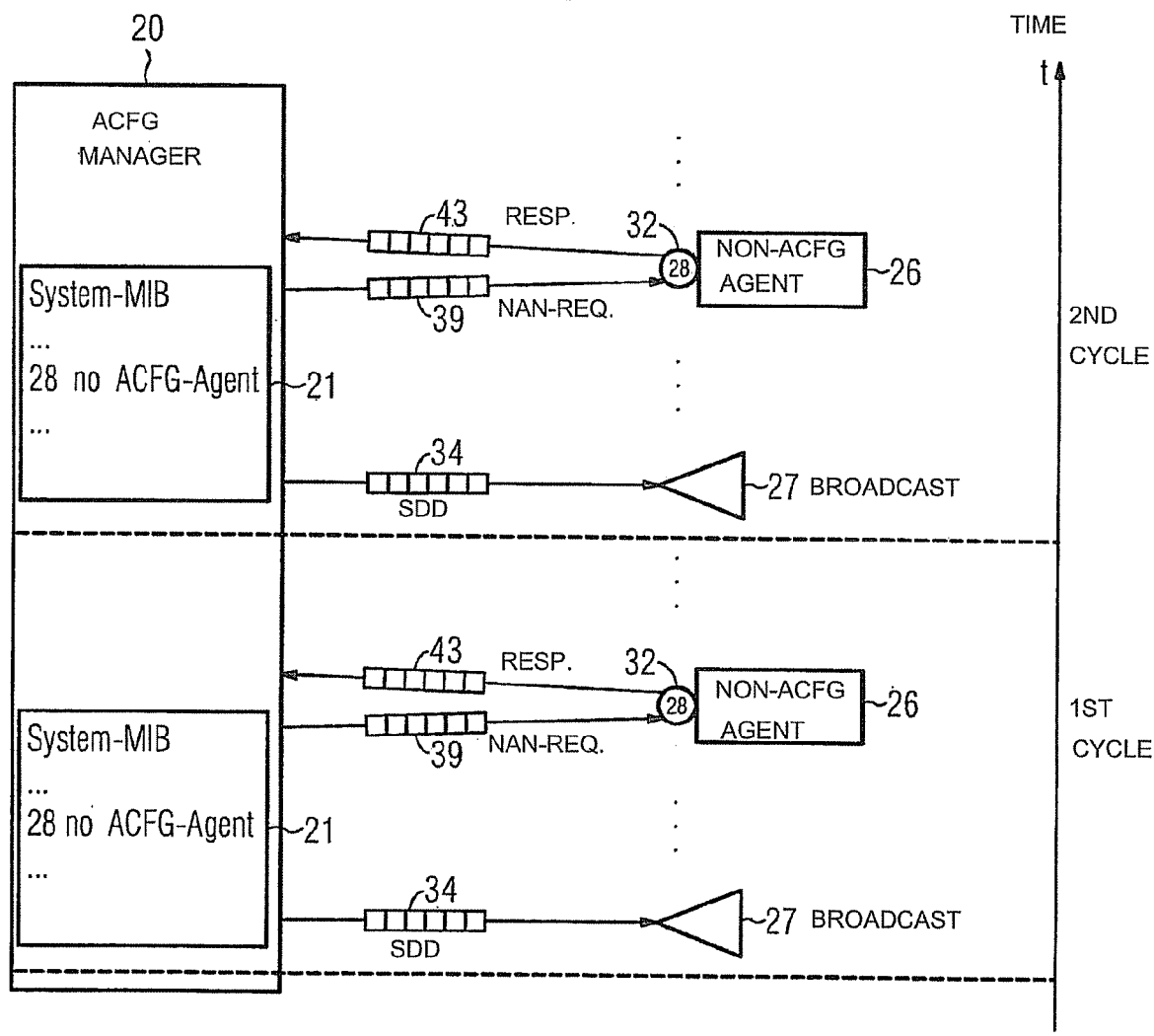

ALLOCATION OF STATION ADDRESSES TO COMMUNICATION USERS IN A BUS SYSTEM

CROSS REFERENCE TO RELATED APPLICATIONS

This application claims priority to the German application No. 10330596.3, filed Jul. 7, 2003 and to the International Application No. PCT/EP2004/007120, filed Jun. 30, 2004 which are incorporated by reference herein in their entirety.

FIELD OF INVENTION

The invention relates to a method for allocation of station addresses to communication users in a bus system, and communication users in a bus system.

BACKGROUND OF INVENTION

The bus system has generally come to predominate in digital technology for the transfer of information between individual users in a system, in other words communication between users. A bus system is characterized in that several communication users are connected on the input side and/or output side in parallel to a shared bus. A bus system is thus a device for collective communication between several users, each user being able to associate with every other user directly. A distinction is made between parallel and serial bus systems. Data is mostly exchanged on a bit-parallel and byte-serial basis, but bit-serial operation is also possible. Depending on the variant, these are known as parallel or serial bus systems. Bit-parallel buses are preferably used for transmitting high data rates over short distances, e.g. within a computer. The merits of bit-serial buses lie in the small outlay for drivers, connectors and transmission lines (often simple two-wire lines). Data transmission is unproblematic even over large distances and the hardware requirement for any electrical isolation needed is comparatively small.

SUMMARY OF INVENTION

Communication users in a bus system, e.g. communication users linked to a serial bus, normally require a unique station address to be able to communicate with one another. In the past various methods have been used with serial bus systems to assign station addresses for the individual communication users. Normally this involves a manual setting via coding switches at the communication users or assigning an address in advance via the bus, whereby it must be possible to address every communication user from the outset. In other customary methods the station address is arrived at on the basis of the position of the communication user on the bus. The data traffic in such a system is generated by what is known as a bus master, to which the structure of the bus must be known. Address conflicts cannot occur in such a case. The bus master generates a precisely specified data frame which has as many data fields as the number of data users connected on the bus. This data frame is sent from one communication user to the next, each user being able to extract its data and to send new data for the bus master. This method is particularly problematic if a communication user has to be exchanged and the bus master does not recognize this change immediately. As a result the data frame is displaced and specific data no longer reaches the right recipient. The methods described for assigning addresses are either very prone to error, like manual assignment with coding switches, or already require a uniqueness attribute for the individual communication users before the address can be assigned. This uniqueness attribute must be known to both the address assignment unit and the communication users.

An object of the invention is to simplify the allocation of station addresses to communication users in a bus system.

This object is achieved by a method for allocating station addresses to communication users in a bus system, whereby exactly one first communication user able to transmit automatically on a bus can allocate to a station address data that uniquely identifies another communication user, or a station address can be characterized as non-occupied, in which method in each communication cycle the first communication user in each case sends a first data packet to each station address, whereby the first data packet if necessary contains data allocated to the respective station address, said data uniquely identifying another communication user, one or more other communication users each send the first communication user a second data packet containing their station address and data uniquely identifying the respective other communication user, whereby the data uniquely identifying the respective other communication user is allocated to the respective station address by the first communication user and the first communication user sends all other communication users a third data packet containing the information about which station addresses are characterized as non-occupied, whereby a communication user that in an earlier communication cycle already sent the first communication user a second data packet containing data uniquely identifying this communication user and that in a subsequent communication cycle receives a first data packet containing data not uniquely identifying this communication user automatically alters the station address thereof to one of the station addresses characterized as non-occupied.

This object is achieved by a communication user in a bus system which can automatically transmit on a bus and has means for allocating to a station address data uniquely identifying another communication user and means for characterizing a station address as non-occupied.

This object is achieved by a communication user in a bus system which has means for sending a first communication user second data packets containing data uniquely identifying the communication user and which can automatically alter the station address thereof.

The invention is based on the idea of having communication users themselves undertake the assignment of station addresses to communication users in a bus system, in particular in a serial bus system, using centrally available information. The inventive method ensures that the station addresses of the communication users are unique. Multiply assigned station addresses are automatically identified and address conflicts that occur are resolved locally by the affected communication users automatically by randomly selecting a potentially free, non-occupied station address. This thus involves a method for autoconfiguration of station addresses. Already assigned station addresses of addressable communication users are not affected by this. Thus all communication users can be reached and addressed. The method does not involve a central assignment of station addresses, but it can form the prerequisite for this. In the inventive method all valid physical station addresses in the bus system can be used completely freely. There is no need for relationships, for example with the physical position of the communication user, nor is the address space in any way restricted. The method does not require additional wiring between the communication users or particular restrictions as regards the topology. It can be applied to the bus topology finally set up for an operation. Since the station address is administered by the communication user itself, disruptions or addressing errors are ruled out even when a communication user is exchanged, e.g. when a module is exchanged.

Mixed configurations with communication users having no means for transmitting to a first communication user second data packets containing data uniquely identifying the respective communication user and not being able to automatically change their station address are possible without negatively affecting these communication users.

The communication cycle is repeated with a particular cycle duration. In order to burden communication resources as little as possible with sending, forwarding, receiving and processing the data packets required for the allocation of station addresses to communication users, it is proposed in accordance with an advantageous embodiment of the invention that the cycle duration of the communication cycle is variable. Thus the cycle duration can, for example in an initial phase in which the addressing has not as yet progressed very far, be selected to be smaller in comparison to a later phase in the addressing procedure in which there is less need for addressing. In particular, following a successful conclusion of the allocation of station addresses to communication users the described communication cycle can be performed only with a comparatively large cycle duration in comparison to other communication cycles, in order for example to be able to respond to changes in the bus system as a result of the exchange or failure of communication users and the like.

On the basis of the inventive method for allocating station addresses to communication users in a bus system an advantageous embodiment of the method is proposed, in which device information can be stored in storage means of the other communication users, it being possible for the storage means to be addressed via the bus by the first communication user and for the device information to be read out by the first communication user. Thus for example all device information needed for an automatic configuration can be stored directly in a memory of the other communication users. For reading out, a message-oriented transmission method, as already defined for most serial bus systems, is for example used. Thus an up-to-date picture of the device information of every other communication user located on the bus is available to the first communication user at all times. The device information comprises, for example, an identification and possible configurations and parameterizations.

Thus project planning and maintenance for a bus system is possible without device information supplied by the manufacturer in the form of electronic data sheets. Thus it is possible to automate further steps in the project planning of a bus system, in particular of a serial bus system. When using this advantageous embodiment of the invention a comparison between the projected communication users with their configuration and parameterization and the situation actually prevailing on the bus is always available to a project planner. Thus project planning errors, errors in wiring and the choice of communication users can be analyzed at a central point and correspondingly rectified.

BRIEF DESCRIPTION OF THE DRAWINGS

The invention is described and explained in more detail below on the basis of the exemplary embodiments shown in the figures.

The figures show:

FIG. 1 a bus system with communication users,
FIG. 2 a first data packet,
FIG. 3 a third data packet,
FIG. 4 the communication between a first communication user and other communication users,
FIG. 5 the communication between a first communication user and another communication user without an address conflict,
FIG. 6 the communication between a first communication user and another communication user without means for sending second data packets and
FIG. 7 the communication between a first communication user and other communication users when an address conflict is present.

DETAILED DESCRIPTION OF INVENTION

Figure 7:
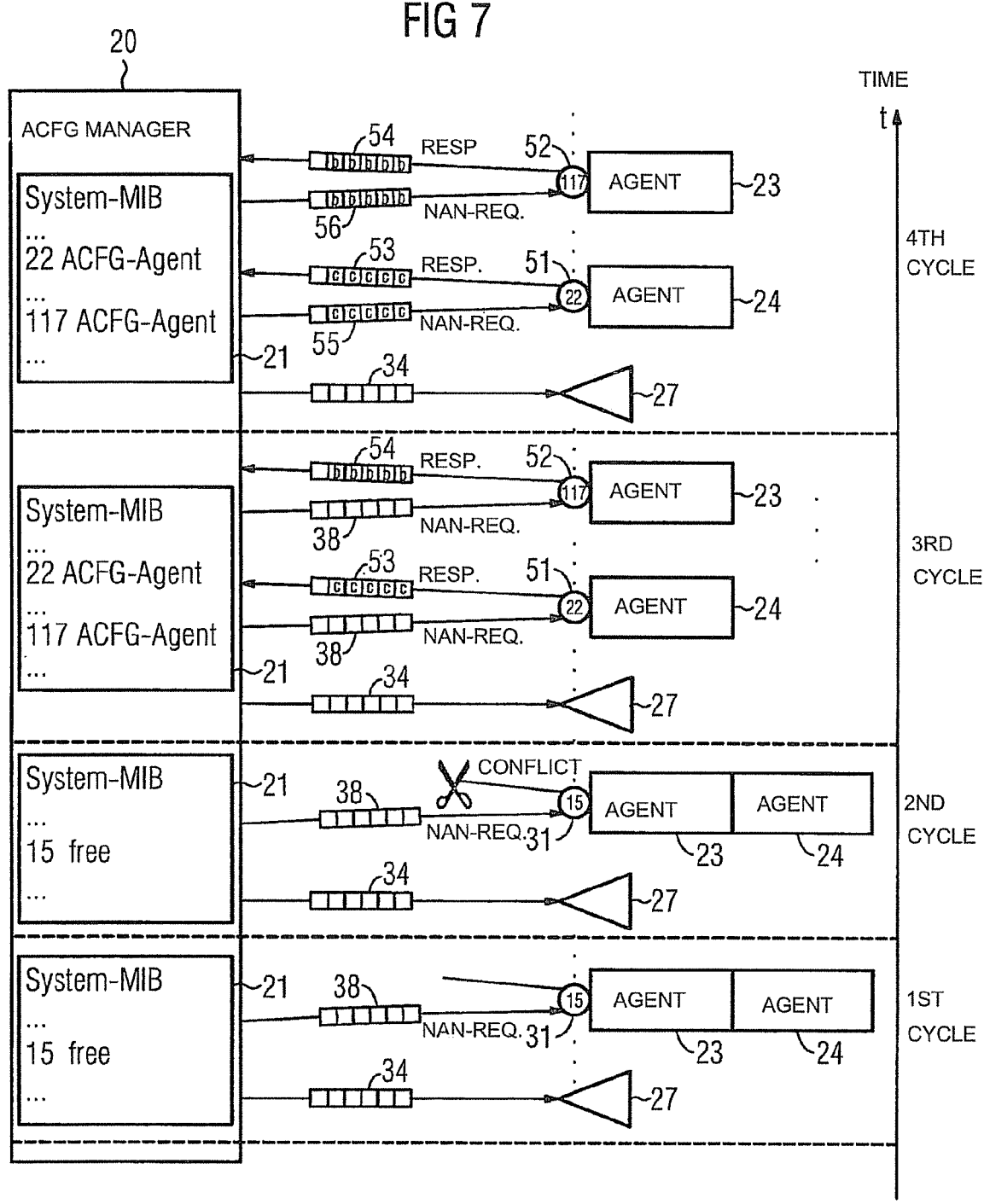

FIG. 1 shows a serial bus system 9 with communication users 1, 2. The communication users 1, 2 are interconnected via a bus 3. A first communication user 1 in the bus system 9 has means 7 for allocating to a station address 6 data uniquely identifying another communication user 2 and for characterizing a station address 6 as non-occupied. The first communication user 1 can in each case send a first data packet 4 to each station address 6, the first data packet 4 if necessary containing data assigned to the respective station address 6 and uniquely identifying another communication user 2. The other communication users 2 in the bus system 9 have means 8 for sending the first communication user 1 second data packets 5 containing data uniquely identifying the respective communication user 2 and can automatically and independently change their station address 6.

FIG. 2 shows a first data packet 10. The first data packet 10 has a first section 11 containing the name of the data packet. Further information on the structure of the first data packet is contained in a second section 12 of the first data packet 10, for example an identification of the data packet and data that uniquely identifies another communication user, such as for example component data and/or a serial number.

FIG. 3 shows a third data packet 13. The third data packet 13 has a first section 14 containing the name of the third data packet. Further information on the structure of the third data packet 13 is contained in a second section 15 of the third data pack et 13. Examples of such information include an identification of the third data packet, status information, information on critical bus parameters and/or information about which station addresses are characterized as non-occupied.

FIG. 4 shows the communication between a first communication user, known as the ACFG manager 20, and other communication users, in this case four so-called ACFG agents 22 to 25 (ACFG=autoconfiguration) and another communication user 26. The communication users are therefore each allocated one of two different roles. The ACFG manager 20 assumes the controlling role for the so-called ACFG mechanism. Only one ACFG manager 20 may be active on the bus system at a time. An ACFG manager 20 must be able to transmit automatically on the bus. In bus systems based on the master-slave principle, the ACFG manager 20 must always be a master. Other communication users connected on the bus system can each assume the role of an ACFG agent 22-25.

The ACFG manager 20 has, as means for allocating to a station address data uniquely identifying another communication user and for characterizing a station address as non-occupied a database in a memory, known as the system MIB (MIB=Management Information Base). In the system MIB 21 each possible station address in the bus system is allocated either a communication user or the information that this station address is not occupied. The ACFG manager 20 can autonomously send data packets on the bus. FIG. 4 shows various data packets. In general data packets are also called PDUs (Protocol Data Units). PDUs sent by the ACFG manager 20 are called request PDUs. PDUs sent by communication users in reply to the request PDUs are called response PDUs.

The ACFG manager 20 initiates a communication cycle, also called an ACFG cycle, in which all station addresses possible in the corresponding serial bus system are addressed. In the exemplary embodiment in FIG. 4 a communication cycle for allocating station addresses to communication users is shown by way of example. The chronological sequence of the data packets corresponds in principle to the direction of the time arrow t. At the start of the communication cycle the ACFG manager 20 sends what is known as an SDD request PDU 34 (SDD =Systems Data Distribution) by broadcast 27 to all users in the bus system. The SDD request PDU 34 is an exemplary embodiment of a third data packet 13 in accordance with FIG. 3. By means of the SDD request PDU 34 all station addresses characterized as non-occupied are announced by the ACFG manager 20 in the bus system. Each ACFG agent saves in each ACFG cycle the list of free bus addresses contained in the SDD request PDU 34.

The request PDUs illustrated below are what are known as NAN request PDUs 35-40 (NAN New Agent Notification). A NAN request PDU is an exemplary embodiment of a first data packet 10 in accordance with FIG. 2. The NAN request PDU 35-40 contains where necessary information uniquely identifying a communication user. The ACFG manager 20 sends a NAN request PDU 35-40 to every available station address 28-33. If the station addresses 28, 30 are not occupied by a communication user, the ACFG manager 20 does not receive a corresponding response PDU to the respective NAN request PDU 35 or 27. In this case the ACFG manager 20 characterizes these station addresses in its system MIB as non-occupied. All station addresses to which no reply is given contain, for example, the entry "free" in the system MIB 21. All station addresses with this entry are simultaneously published as a broadcast message at the start of each ACFG cycle by means of an SDD request PDU 34 to all communication users.

If a NAN request PDU 36, 40 is sent to a station address 29 or 33 which is allocated to an ACFG agent 22 or 25 participating in the described procedure, the ACFG manager 20 in each case receives a NAN response PDU 41 or 42 having data uniquely identifying the respective ACFG agent 22 or 25. A station address 29, 33 to which a response is given with such a correct NAN response PDU 41, 41 contains the entry "ACFG agent" in the system MIB 21 of the ACFG manager 20. Additionally the transmitted data of the respective NAN response PDU 41, 42 is recorded. The communication user with this station address is then addressed with a NAN request PDU 36, 40, the contents of which correspond to the NAN response PDU 41, 42. The communication user thus continually has the assurance that it is correctly identified by the ACFG manager 20 as exactly this ACFG agent and has been included in the system MIB 21.

If a station address is allocated simultaneously to several ACFG agents 23, 24, an address conflict arises and the ACFG manager 20 likewise receives no valid NAN response PDU and this station address 31 would be characterized in its system MIB 21 as non-occupied.

If a NAN request PDU 39 is sent to a station address 32 used by a communication user 26 not using the described method, this communication user 26 will send a PDU 43 to the ACFG manager 20, which however contains none of this data uniquely identifying this communication user 26. The communication user 26 is identified by the ACFG manager 20 as a communication user without ACFG agent functionality. In this case the ACFG manager 20 will allocate the attribute "not an ACFG agent" to the corresponding station address 32. The station address 32 continues to be addressed with a NAN request PDU—in this case the same one as during the previous addressing.

FIG. 5 shows the communication between a first communication user and another communication user without an address conflict. The first communication user, in accordance with FIG. 4 the ACFG manager 20 with a system MIB 21, sends data packets to the ACFG agent 22 via a bus not shown here. FIG. 5 shows two communication cycles for allocating station addresses, the start of a communication cycle in each case being indicated by a broken line. The time progression is again symbolized by a time arrow t. In the first communication cycle a NAN request PDU 36 is sent to the station address 29 allocated to the ACFG agent 22 after the mandatory SDD request PDU 34. The ACFG agent 22 then sends a NAN response PDU 41 in reply, containing information uniquely identifying this ACFG agent 22. The ACFG manager 20 then in its system MIB allocates to the station address 29 this information characterizing the ACFG agent 22. In a second following communication cycle the ACFG manager 20 sends the station address 29 a NAN request PDU 50 containing the information uniquely identifying the ACFG agent 22. The ACFG agent 22 then recognizes that the ACFG manager 20 has allocated it to the correct station address and in reply again sends the NAN response PDU 41. Corresponding to the second communication cycle further following communication cycles are executed in respect of this station address and this ACFG agent 22.

FIG. 6 shows the communication between a first communication user and another communication user having no means for sending second data packets. The first communication user, in accordance with FIGS. 4 and 5 the ACFG manager 20 with a system MIB 21, sends an SDD request PDU 34 in a first communication cycle to all communication users by means of a broadcast 27. The ACFG manager 20 sends a NAN request PDU 39 to the station address 32. The communication user 26 to whom this station address 32 is allocated has however no means for sending second data packets having data uniquely identifying the communication user and hence sends in reply a PDU 43 not containing any data uniquely identifying this communication user 26 or the communication user 26 sends no reply or no data packet at all. The ACFG manager 20 then allocates the information or attribute "not an ACFG agent" in its system MB to the respective station address 32. In all other further communication cycles the ACFG manager 20 again sends a NAN request PDU 39 to the station address 32 and in reply receives from the communication user 26 in each case a PDU 43 not containing data identifying this communication user.

FIG. 7 shows the communication between a first communication user and other communication users when an address conflict occurs. Again several communication cycles are illustrated, following one another in the direction of the time arrow t, the start of which is indicated in each case by a broken line. The first communication user in the exemplary embodiment according to FIG. 7 is again the ACFG manager 20 having a system MB 21 for allocating information to station addresses. At the start of each communication cycle shown here the ACFG manager 20 sends an SDD request PDU 34 by broadcast 27 to all station addresses or all communication users containing the information about non-occupied station addresses. In the first communication cycle shown here the ACFG manager 20 sends a NAN request PDU 38 to the station address 31. However, this station address 31 is simultaneously allocated to two different ACFG agents 23 and 24. The ACFG manager 20 then receives no response PDU uniquely identifying an individual ACFG agent and hence characterizes the station address 31 as non-occupied in its system MIB 21.

In a second communication cycle this station address 31 characterized as non-occupied is therefore again sent a NAN request PDU 38 by the ACFG manager 20 which does not contain information uniquely identifying one of the two ACFG agents 23 or 24. Both ACFG agents 23 and 24 thereby recognize that they could not be uniquely allocated to the station address 31 by the ACFG manager 20 and then automatically select for themselves a new station address 51 or 52 from the pool of station addresses characterized as non-occupied which were notified by broadcast 27 by means of the SDD request PDU 34. Thus an address conflict is signaled in the ACFG agent 23, 24 if the ACFG agent 23, 24 does not receive the contents of its own NAN response PDU after receipt of a NAN request PDU 38 in the next ACFG cycle. In this case the ACFG agent 23, 24 withdraws from the bus and returns to the bus with a randomly selected station address from its list of free station addresses. This procedure is repeated until the station address of the ACFG agent 23, 24 is recognized by the ACFG manager 20 and has been included in the system MIB 21 thereof.

In the third communication cycle shown here the ACFG manager 20 will send these station addresses 51 and 52 previously characterized as non-occupied a NAN request PDU 38 not containing information uniquely identifying a communication user. The ACFG agents 23 and 24 reply to this NAN request PDU 38 in each case with a NAN response PDU 53 or 54 containing information uniquely identifying the respective ACFG agents 23 and 24. The ACFG manager 20 can then allocate the station addresses 51 and 52 the corresponding information contained in the NAN response PDUs 53 or 54. In the following communication cycle the ACFG manager 20 then sends the respective station address 51 or 52 NAN request PDUs 55 and 56 containing the information uniquely identifying the respective ACFG agents 24 or 23. The ACFG agents 23 and 24 reply with the corresponding NAN response PDUs 54 or 53.

All station addresses on which there is an address conflict can have very different reactions depending on the bus system, topology and configuration of the respective bus system. Within the described procedure for autoconfiguration the reactions described below are expected and overcome. In a first case the ACFG manager 20 does not receive an answer from this station address because the data packet has been so destroyed by overlaying that no interpretation is possible. In this case this station address is again addressed in the next ACFG cycle with a NAN request PDU without corresponding data contents of the ACFG agent. The ACFG agent recognizes that the communication to the ACFG manager 20 was not successful and automatically alters the station address thereof. In a second case the ACFG manager 20 receives an unknown reply from this station address because the data packet has been corrupted by overlaying but not completely destroyed. In this case this station address is addressed again in the next ACFG cycle with a NAN request without corresponding data contents of the ACFG agent. The ACFG agent also recognizes in this case that the communication to the ACFG manager 20 was not successful and automatically alters the station address thereof. In a third case the ACFG manager 20 receives a correct NAN response PDU from this station address, because one of the telegrams of the different ACFG agents was able to prevail electrically on the transmission medium. This behavior can be observed in the case of particular topologies with very long bus lines, repeaters or couplers for linking different physical media if an ACFG agent is located very close to the ACFG manager 20 and another ACFG agent is relatively far away or is located in another bus segment. Very different response times emerge from this for the two ACFG agents. In this case the ACFG manager 20 sends a NAN request PDU in the next cycle with the data contents of one of the ACFG agents. All other ACFG agents located on this station address recognize that the communication to the ACFG manager 20 was unsuccessful and alter the station address thereof.

According to another exemplary embodiment all device information needed for an automatic configuration is stored directly in the memory of the ACFG agent. This memory can be uniquely addressed via the bus from the ACFG manager 20 so that the ACFG manager 20 can automatically read out all device information needed for the configuration from the ACFG agents. A message-oriented transmission method is used, for example, for reading out, as already defined for most serial bus systems. Thus an up-to-date picture of the device information of every ACFG agent located on the serial bus is available in the system MIB 21 of the ACFG manager 20 at all times. The device information essentially consists of an identification and possible configurations and parameterizations. On the basis of this data, project planning of the serial bus is possible without extra device information supplied by the manufacturer in the form of electronic data sheets.

According to another embodiment it is possible to predefine expected project planning data in the ACFG manager 20. In this case the expected project planning data is compared to the actual current status on the serial bus and any divergences are displayed. This is visualized with the aid of corresponding displays on all ACFG agents, so that project planning progress and error events can be recognized in every part of a system. Thus a project planner always has available a comparison between the projected communication users with their configuration and parameterization and the situation actually prevailing on the serial bus. Thus project planning errors, errors when setting up the bus system, errors in wiring and the choice of communication users can be analyzed and correspondingly rectified significantly more easily at one central point.

When specifying expected project planning data it is possible but not necessary to assign desired station addresses for all communication users located on the bus. If station addresses have been projected, they can be assigned very easily by the ACFG manager 20 on the basis of the behavior when resolving address conflicts. Within a few iteration steps across all station addresses all projected station addresses can be assigned one after the other. Address conflicts which then arise again are resolved by the ACFG agents automatically. Only those ACFG agents to which no projected station address has as yet been allocated temporarily accept a random free station address. All other ACFG agents retain their explicitly allocated station address.

Another embodiment of the method relates to the unique identification of communication users where this is not possible on the basis of the project planning data. In this case an acyclic communication channel is opened between the ACFG manager 20 and the ACFG agents which cannot be allocated to the project planning. Manual identification takes place by means of a sequence of read and write commands and corresponding displays and input aids for the ACFG agents.

In summary, the invention thus relates to a method for simplified allocation of station addresses 6 to communication users 2 in a bus system 9, and communication users 1, 2 in a bus system 9. Exactly one first communication user 1 able to transmit automatically on the bus 3 can then allocate data to a station address 6, said data uniquely identifying another communication user 2 or characterizing a station address 6 as non-occupied. Another communication user 2 that in an earlier communication cycle already sent the first communication user 1 a data packet containing data uniquely identifying this communication user 2 and that in a subsequent communication cycle receives a data packet 10 containing data not uniquely identifying this communication user 2 can automatically alter the station address 6 thereof into a station address 6 characterized as non-occupied.

The invention claimed is:

1. A method of allocating station addresses to communication users arranged in a bus system, wherein communication on the bus system is organized in communication cycles, and a first communication user on the bus assigned a controlling role as a manager and having a database comprising a list of each possible station of the bus and a current allocation for each station address as either a communication user or a non-occupied station address is configured to:

autonomously transmit data to all station addresses on the bus system, allocate data to a each station address in the database, the data uniquely identifying a communication user, or characterize the station address as not allocated, the method comprising:

transmitting in a first communication cycle, by a first communication user on the bus, to all station addresses on the bus:

(a) a first broadcast request comprising a list of currently non-occupied station addresses from the database of the first communication user so that all other users on the bus can save the list of currently non-occupied station addresses; and (b) a first new agent request to all station addresses on the bus requesting a new agent response, wherein:

(i) for each non-responsive station address in which no response is received, the current allocation is updated to non-occupied in the database, and (ii) for each responsive station address in which a response comprising data uniquely identifying the agent at that station address is received, the current allocation is updated to a communication user and the data uniquely identifying the agent at that address is recorded in the database;

transmitting in a second communication cycle, by the manager:

(a) a second broadcast request to all station addresses on the bus comprising the list of currently non-occupied station addresses from the database of the first communication user as updated in the first communication cycle so that all other users on the bus can save the list of currently non-occupied station addresses; and (b) a second new agent request addressed to each responsive station address on the bus comprising (i) the data uniquely identifying the agent at that station address as recorded in the database as confirmation, thereby assuring the communication user at that station address of correct identification by the manager, and (ii) the data uniquely identifying the agent at each responsive station address as recorded in the database, thereby allowing communications among communication users by correct identification.

2. The method according to claim 1, wherein the communication cycles have a variable cycle time.

3. The method according to claim 1, further comprising: storing device information comprising data uniquely identifying the agent in a memory device assigned to the communication user;

accessing the stored device information via the bus system by the first communication user; and reading the stored device information by the first communication user.

4. The method according to claim 3, further comprising automatically configuring the bus system by repeating the method steps.

5. A communication user in a bus system adapted to perform the steps of claim 1.

6. The method of allocating station addresses of claim 1 further comprising the first new agent request of the first communication cycle (iii) for each non-agent responsive station address in which the response is received but does not comprise data uniquely identifying the agent at that station address, the current allocation in the database for that station address is updated to a communication user without agent functionality, providing for communications with the communication user at that non-agent responsive station address without unique identification.

7. The method of allocating station addresses of claim 6 further comprising in the first new agent request of the first communication cycle (iv) for each conflicting station address, having more than one agent allocated thereto, no response is received, and the current allocation is updated to non-occupied in the database, so that the transmission by the manager during the second cycle identifying the conflicting station address as non-occupied signals the more than one agent allocated to the conflicting station address of the conflict so that the more than one agent allocated to the conflicting station address can automatically select a new station address from the list of currently non-occupied station addresses.

8. The method of allocating station addresses of claim 1 wherein the second new agent request comprises a data packet wherein a section of the data packet includes the data uniquely identifying the agent at each responsive station address.

9. The method of claim 8 wherein the data uniquely identifying the agent comprises component data or a serial number or both.

10. The method of allocating station addresses of claim 1 wherein the broadcast request comprises a data packet wherein a section of the data packet includes list of currently non-occupied station addresses.

11. A method of allocating station addresses to communication users arranged in a bus system that requires unique stations addresses for communication users to be able to communicate with one another, wherein communication on the bus system is organized in communication cycles, comprising:

transmitting in a first communication cycle, by a first communication user on the bus assigned a controlling role as a manager and having a database comprising a list of each possible station of the bus and a current allocation for each station address as either a communication user or a non-occupied station address, to all station addresses on the bus:

(a) a first broadcast request comprising a list of currently non-occupied station addresses from the database of the first communication user so that all other users on the bus can save the list of currently non-occupied station addresses; and (b) a first new agent request to all station addresses on the bus requesting a new agent response, wherein:

(i) for each non-responsive station address in which no response is received, the current allocation is updated to non-occupied in the database, and (ii) for each responsive station address in which a response comprising data uniquely identifying the agent at that station address is received, the current allocation is updated to a communication user and the data uniquely identifying the agent at that address is recorded in the database;

transmitting in a second communication cycle, by the manager:

(a) a second broadcast request to all station addresses on the bus comprising the list of currently non-occupied station addresses from the database of the first communication user as updated in the first communication cycle so that all other users on the bus can save the list of currently non-occupied station addresses; and (b) a second new agent request addressed to each responsive station address on the bus comprising (i) the data uniquely identifying the agent at that station address as recorded in the database as confirmation, thereby assuring the communication user at that station address of correct identification by the manager, and (ii) the data uniquely identifying the agent at each responsive station address as recorded in the database, thereby allowing communications among communication users by correct identification.

12. The method of allocating station addresses to communication users of claim 11 further comprising in the first new agent request of the first communication cycle (iii) for each non-agent responsive station address in which the response is received but does not comprise data uniquely identifying the agent at that station address, the current allocation in the database for that station address is updated to a communication user without agent functionality, providing for communications with the communication user at that non-agent responsive station address without unique identification.

13. The method of allocating station addresses to communication users of claim 12 further comprising in the first new agent request of the first communication cycle (iv) for each conflicting station address, having more than one agent allocated thereto, no response is received, and the current allocation is updated to non-occupied in the database, so that the transmission by the manager during the second cycle identifying the conflicting station address as non-occupied signals the more than one agent allocated to the conflicting station address of the conflict so that the more than one agent allocated to the conflicting station address can automatically select a new station address from the list of currently non-occupied station addresses.

14. The method of allocating station addresses of claim 11 wherein the second new agent request comprises a data packet wherein a section of the data packet includes the data uniquely identifying the agent at each responsive station address.

15. The method of claim 14 wherein the data uniquely identifying the agent comprises component data or a serial number or both.

16. The method of allocating station addresses of claim 11 wherein the broadcast request comprises a data packet wherein a section of the data packet includes list of currently non-occupied station addresses.

17. A communication user in a bus system adapted to perform the steps of claim 11.

\* \* \* \* \*